US012019195B2

(12) United States Patent
Cha et al.

(10) Patent No.: US 12,019,195 B2
(45) Date of Patent: Jun. 25, 2024

(54) METHOD AND APPARATUS FOR ESTIMATING S-WAVE VELOCITIES BY LEARNING WELL LOGS

(71) Applicants: SK INNOVATION CO., LTD., Seoul (KR); SK EARTHON CO., LTD., Seoul (KR)

(72) Inventors: Seungjoon Cha, Daejeon (KR); Youngki Choi, Daejeon (KR); Hee Jeong Jang, Daejeon (KR); Kyoung Jin Lee, Daejeon (KR); Hyunjong Cho, Gyeonggi-do (KR)

(73) Assignees: SK INNOVATION CO., LTD. (KR); SK EARTHON CO., LTD. (KR)

( * ) Notice: Subject to any disclaimer, the term of this patent is extended or adjusted under 35 U.S.C. 154(b) by 0 days.

(21) Appl. No.: 18/351,906

(22) Filed: Jul. 13, 2023

(65) Prior Publication Data

US 2023/0358908 A1    Nov. 9, 2023

Related U.S. Application Data

(63) Continuation of application No. 17/865,703, filed on Jul. 15, 2022, now Pat. No. 11,796,698, and a (Continued)

(30) Foreign Application Priority Data

Jun. 4, 2020    (KR) .......................... 10-2020-0067930

(51) Int. Cl.
*G01V 1/28*    (2006.01)
*E21B 47/04*    (2012.01)
(Continued)

(52) U.S. Cl.
CPC .............. *G01V 1/282* (2013.01); *E21B 47/04* (2013.01); *G01V 1/303* (2013.01); *G01V 1/50* (2013.01);
(Continued)

(58) Field of Classification Search
USPC ........................................................ 702/18
See application file for complete search history.

(56) References Cited

U.S. PATENT DOCUMENTS 5,265,016 A    11/1993    Hanson et al.
5,579,282 A    11/1996    Barr
(Continued)

FOREIGN PATENT DOCUMENTS

CN    103424772 A    12/2013

*Primary Examiner* — Paul D Lee
(74) *Attorney, Agent, or Firm* — Bracewell LLP; Brad Y. Chin

(57) ABSTRACT

Disclosed are a method and apparatus for estimating S-wave velocities by learning well logs, whereby the method includes a model formation step of forming an S-wave estimation model to output S-wave velocities corresponding to measured depth when the well logs are input based on train data sets including train data having values of multiple factors included in the well logs, the values being arranged corresponding to measured depth, and label data having S-wave velocities corresponding to measured depth as answers, and an S-wave velocity estimation step of inputting unseen data having values of multiple factors included in well logs acquired from a well at which S-wave velocities are to be estimated, the values being arranged corresponding to measured depth, to the S-wave estimation model to estimate S-wave velocities corresponding to measured depth.

5 Claims, 9 Drawing Sheets

Related U.S. Application Data continuation of application No. 17/248,649, filed on Feb. 1, 2021, now Pat. No. 11,422,276.

(51) Int. Cl.
*G01V 1/30* (2006.01)
*G01V 1/50* (2006.01)
 G06N 20/00 (2019.01)

(52) U.S. Cl.
CPC .......... *E21B 2200/20* (2020.05); *G01V 1/284* (2013.01); *G06N 20/00* (2019.01)

(56) References Cited

U.S. PATENT DOCUMENTS

| | | |
|---|---|---|
| 9,696,442 B2 | 7/2017 | Li et al. |
| 2004/0220743 A1 | 11/2004 | Sahai et al. |
| 2019/0064389 A1 | 2/2019 | Denli et al. |
| 2019/0346581 A1* | 11/2019 | Boyd ..................... G01V 1/284 |
| 2019/0368316 A1 | 12/2019 | Bize-Forest et al. |
| 2019/0383965 A1 | 12/2019 | Salman et al. |
| 2020/0065620 A1 | 2/2020 | Feng et al. |
| 2020/0088897 A1* | 3/2020 | Roy ....................... G01V 1/303 |
| 2020/0341159 A1 | 10/2020 | Le Calvez et al. |
| 2021/0326721 A1 | 10/2021 | Zhang et al. |
| 2021/0356616 A1* | 11/2021 | Yang ..................... G01V 1/284 |

\* cited by examiner

FIG.2

| WELL A | LATITUDE | 35°N | LONGITUDE | 120°E | DRILLING DATE | 2001.02.03 |
|---|---|---|---|---|---|---|
| MEASURED DEPTH | FIRST FACTOR | SECOND FACTOR | THIRD FACTOR | FOURTH FACTOR | N-TH FACTOR | S-WAVE VELOCITY |
| ... | ... | ... | ... | ... | ... | ... |
| 0.079 | 0.815835 | 0.394038 | 0.243546 | 0.000291 | ... | 774.578 |
| 0.082 | 0.236862 | 0.920196 | 0.654317 | 0.012224 | ... | 743.970 |
| 0.085 | 0.345256 | 0.004921 | 0.234125 | 0.995870 | ... | 727.577 |
| 0.088 | 0.346515 | 0.913601 | 0.016531 | 0.801287 | ... | 724.335 |
| 0.091 | 0.764325 | 0.844360 | 0.725043 | 0.142312 | ... | 698.257 |
| 0.094 | 0.293488 | 0.153874 | 0.196332 | 0.529454 | ... | 710.519 |
| 0.097 | 0.848586 | 0.423441 | 0.004803 | 0.192035 | ... | 721.597 |
| 0.010 | 0.928771 | 0.154364 | 0.942604 | 0.100402 | ... | 790.257 |
| 0.013 | 0.234986 | 0.723495 | 0.2941530 | 0.548290 | ... | 791.958 |
| ... | ... | ... | ... | ... | ... | ... |

…

METHOD AND APPARATUS FOR ESTIMATING S-WAVE VELOCITIES BY LEARNING WELL LOGS

CROSS REFERENCE TO RELATED APPLICATION

This application is a continuation patent application of and claims the benefit of and priority to U.S. patent application Ser. No. 17/865,703, filed on Jul. 15, 2022, entitled, "METHOD AND APPARATUS FOR ESTIMATING S-WAVE VELOCITIES BY LEARNING WELL LOGS," which is a divisional patent application of and claims the benefit of and priority to U.S. patent application Ser. No. 17/248,649, filed on Feb. 1, 2021, now U.S. Pat. No. 11,422,276 issued Aug. 23, 2022, entitled, "METHOD AND APPARATUS FOR ESTIMATING S-WAVE VELOCITIES BY LEARNING WELL LOGS," which claims the benefit of and priority to Korean Patent Application No. 10-2020-0067930, filed Jun. 4, 2020, the entire contents of which are incorporated herein for all purposes by this reference.

BACKGROUND OF THE INVENTION

Field of the Invention

The present invention relates to a method and apparatus for estimating S-wave velocities by learning well logs.

Description of the Related Art

Various resources, such as coal, petroleum, natural gas, and minerals, exist under the ground. In order to explore for a possibility of existence of subsurface natural resources, a drilling process in strata is performed to directly inspect the strata. When drilling is performed, it is possible to acquire well logs, which are records of rock properties acquired during a drilling process in the strata. A shear wave (S-wave) velocity is one of the elements among well logs that importantly considered when estimating underground physical properties. During the process of acquiring the well logs from the well, however, the S-wave velocity may not be measured depending on circumstances.

In the case in which the S-wave velocity is not present in the well logs, other factors of the well logs could be analyzed to estimate the S-wave velocity in the strata. Conventionally, a method of a small number of petrophysicists analyzing the well logs and estimating the S-wave velocity based on their empirical judgment has been used. Manual velocity estimation by domain experts requires efforts to analyze a huge amount of different data, high costs, and time. Nonetheless high accuracy is not guaranteed, and even different results may be derived depending on who analyzed it.

RELATED ART DOCUMENTS

Patent Documents (Patent Document 1) CN 103424772 A

SUMMARY

The objective of the present invention is to provide a method and apparatus for estimating S-wave velocities using an artificial intelligence model that has learned well logs.

In accordance with an aspect of the present invention, the above and other objects can be accomplished by the provision of a method of estimating S-wave velocities by learning well logs, the method including the step of a model formation step of forming an S-wave estimation model to output S-wave velocities corresponding to measured depth when the well logs are input based on train data sets including train data having values of multiple factors included in the well logs, the values being arranged corresponding to measured depth, and label data having S-wave velocities corresponding to measured depth as answers. The method further including the step of an S-wave velocity estimation step of inputting unseen data having values of multiple factors included in well logs acquired from a well at which S-wave velocities are to be estimated, the values being arranged corresponding to measured depth, to the S-wave estimation model to estimate S-wave velocities corresponding to measured depth.

According to an embodiment, the unseen data is not included in the train data sets. According to an embodiment, the model formation step includes a train data set generation step of generating train data sets including train data having measured values of the multiple factors included in the well logs based on a target measured depth, a measured depth shallower than the target measured depth, and a measured depth deeper than the target measured depth, the measured values being disposed in a two-dimensional matrix structure, and label data having S-wave velocities at the target measured depth as answers.

According to an embodiment, the model formation step further includes a model training step of training an S-wave estimation model with a multipoint convolution model structure that outputs S-wave velocities at the target measured depth, the measured depth shallower than the target measured depth, and the measured depth deeper than the target measured depth for each measured depth using the train data sets. According to an embodiment, the two-dimensional matrix structure includes the measured depth located in a first column, and one or more factors located in subsequent columns. The measured depth is arranged in odd-numbered rows with the target depth placed at the center, and the measured depth is arranged in order, and the S-wave estimation model learn information about strata at the target measured depth and learn information about strata shallower than the target measured depth and strata deeper than the target measured depth.

According to an embodiment, the S-wave velocity estimation step includes a unseen data generation step of generating unseen data having measured values of the multiple factors included in the well logs based on the target measured depth, the measured depth shallower than the target measured depth, and the measured depth deeper than the target measured depth, the measured values being disposed in a two-dimensional matrix structure based on the well logs acquired from the well at which S-wave velocities are to be estimated. According to an embodiment, the S-wave velocity estimation step includes a model use step of outputting S-wave velocities for each of the measured depths corresponding to the measured depths included in the train data of the train data sets, output as a result of inputting the unseen data to the S-wave estimation model and deciding the S-wave velocity at the measured depth corresponding to the target measured depth as an estimated S-wave velocity.

According to an embodiment, the model use step further includes an ensemble process of deciding a final S-wave velocity by synthesizing S-wave velocities corresponding to measured depth corresponding to the target measured depth, present in each of a plurality of predicted labels output as a result of inputting all unseen data comprising measured depths corresponding to the target measured depth to the S-wave estimation model.

According to another embodiment, there is provided an apparatus for estimating S-wave velocities by learning well logs, the apparatus includes well log database (DB) configured to store well logs, which are data acquired through measurement and analysis after drilling in strata, and S-wave velocities corresponding to measured depth, a train data set generation unit configured to generate train data sets comprising train data having values of multiple factors included in the well logs stored in the well log DB, the values being arranged corresponding to measured depth, and label data having S-wave velocities corresponding to measured depth as answers, a model training unit configured to train an S-wave estimation model to output S-wave velocities corresponding to measured depth when the well logs are input using the train data sets, and S-wave velocities estimation unit configured to input unseen data having values of multiple factors included in well logs acquired from a well at which S-wave velocities are to be estimated, the values being arranged corresponding to measured depth, to the S-wave estimation model trained by the model training unit in order to estimate S-wave velocities corresponding to measured depth.

According to an embodiment, the train data set generation unit, the model training unit, and the S-wave velocities estimation unit are realized as program code and driven by a processor, whereby the train data sets and the unseen data are measured values of the multiple factors included in the well logs based on a target measured depth, a measured depth shallower than the target measured depth, and a measured depth deeper than the target measured depth, the measured values being disposed in a two-dimensional matrix structure based on the well logs acquired from the well at which S-wave velocities are to be estimated. According to an embodiment, the S-wave estimation model has a multipoint convolution model structure configured to output S-wave velocities at the target measured depth, the measured depth shallower than the target measured depth, and the measured depth deeper than the target measured depth for each measured depth using the train data sets.

According to an embodiment, the two-dimensional matrix structure includes the measured depth located in a first column, and one or more factors located in subsequent columns. The measured depth is arranged in odd-numbered rows with the target depth placed at the center, and the measured depth is arranged in order. The S-wave estimation model learn information about strata at the target measured depth and learn information about strata shallower than the target measured depth and strata deeper than the target measured depth.

According to an embodiment, the S-wave velocities estimation unit further performs an ensemble process of deciding a final S-wave velocity: by inputting the unseen data having values of the multiple factors included in the well logs acquired from the well at which S-wave velocities are to be estimated, the values being arranged corresponding to measured depth, to the S-wave estimation model trained by the model training unit to estimate S-wave velocities corresponding to measured depth, and by synthesizing S-wave velocities corresponding to measured depth corresponding to the target measured depth, present in each of a plurality of predicted labels output as a result of inputting all unseen data comprising measured depths corresponding to the target measured depth to the S-wave estimation model.

The features and advantages of the present invention will be more clearly understood from the following detailed description taken in conjunction with the accompanying drawings.

It should be understood that the terms used in the specification and appended claims should not be construed as being limited to general and dictionary meanings but should be construed based on meanings and concepts according to the spirit of the present invention on the basis of the principle that the inventor is permitted to define appropriate terms for the best explanation.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a view illustrating example data stored in a well log DB according to an embodiment of the present invention.

DETAILED DESCRIPTION OF THE INVENTION

Figure 1:
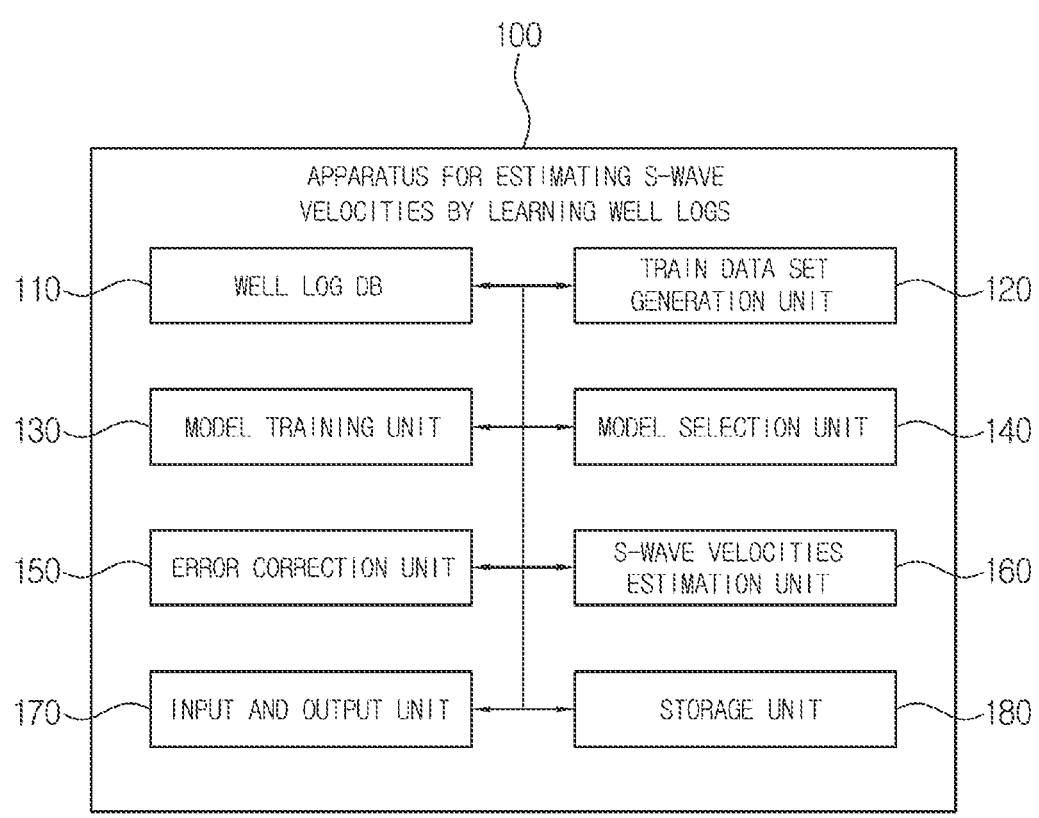
FIG. 1 is a block diagram showing an apparatus for estimating S-wave velocities by learning well logs according to an embodiment of the present invention.

Objects, advantages, and features of the present invention will be apparent from the following detailed description of embodiments with reference to the accompanying drawings. It should be noted that, when reference numerals are assigned to the elements of the drawings, the same reference numeral is assigned to the same elements even when they are illustrated in different drawings. In addition, the terms "first", "second", etc. are used to describe various elements irrespective of sequence and/or importance and to distinguish one element from another, and elements are not limited by the terms. When denoting elements with the terms "first", "second", etc. by reference numerals, "-1", "-2", etc. may be added to the reference numerals. In the following description of the embodiments of the present invention, a detailed description of known technology incorporated herein will be omitted when the same may obscure the subject matter of the embodiments of the present invention.

Hereinafter, the embodiments of the present invention will be described in detail with reference to the accompanying drawings.

FIG. 1 is a block diagram showing an apparatus 100 for estimating S-wave velocities by learning well logs according to an embodiment of the present invention.

Referring to FIG. 1, the apparatus 100 for estimating the S-wave velocity by learning the well logs according to the embodiment of the present invention may include a well log database (DB) 110, a train data set generation unit 120, a model training unit 130, a model selection unit 140, an error correction unit 150, S-wave velocities estimation unit 160, an input and output unit 170, and a storage unit 180.

FIG. 2 is a view illustrating example data stored in a well log DB 110 according to an embodiment of the present invention.

Referring to FIG. 2, the well log DB 110 stores well logs, which are data acquired through measurement and analysis after drilling in strata, and S-wave velocities corresponding to measured depth. The well log DB 110 may store well logs including measured depths, types of well log factors, and values corresponding to the measured depth of the factors, lithofacies corresponding to measured depth, and information about wells. Each well has its own log. The well logs may have various types of factors depending on drilling companies or drilling methods, and may be provided in various forms of data.

The factors of the well logs data are acquired either through the direct measurements while drilling in strata, or through calculation or analysis. The well logs include the measured values of the respective factors corresponding to measured depth.

The factors of the well logs may include measured depth, borehole diameter, Gamma ray, resistivity, bulk density, neutron porosity, photoelectric factor, compressional sonic, shear sonic, volume of clay, volume of calcite, volume of quartz, volume of tuff, effective porosity, water saturation, bulk modulus, P-wave velocity, and S-wave velocity.

The well log DB 110 stores S-wave velocities that either directly measured or known by analysis in association with measured depths. The lithofacies indicate the types of rocks at respective measured depths.

The lithofacies may include shale, sandstone, coal, calcareous shale, and limestone.

The well logs may be stored together with information about a well from which the well logs have been acquired. The information about the well may include information, such as serial number, name, location, and drilling date. The location of the well may be indicated using latitude and longitude.

FIG. 1 is referred back to.

The train data set generation unit 120 may generate train data sets including train data TD having values of the multiple factors included in the well logs stored in the well log DB 110, the values being arranged corresponding to measured depth, and label data LD having S-wave velocities corresponding to measured depth as answers.

The train data set generation unit 120 generates train data sets TS necessary to train an S-wave estimation model using the data stored in the well log DB 110. Specifically, the train data set generation unit 120 may sample data of well logs which S-wave velocities are known, in a various way to generate train data sets TS including train data TD having values of the multiple factors included in the well logs, the values being arranged corresponding to measured depth, and label data LD having S-wave velocities corresponding to measured depth as answers. The train data set generation unit 120 may sample some of the data stored in the well log DB 110 and arrange the same in a structure set based on kind of the S-wave estimation model to generate train data sets TS.

In case the S-wave estimation model is a convolution neural network structure that outputs S-wave velocities at a target measured depth, a measured depth shallower than the target measured depth, and a measured depth deeper than the target measured depth for each measured depth using train data sets TS, train data sets TS and unseen data UD generated by the train data set generation unit 120 may be measured values of the multiple factors included in the well logs based on a target measured depth, a measured depth shallower than the target measured depth, and a measured depth deeper than the target measured depth, the measured values being disposed in a two-dimensional matrix structure based on the well logs acquired from the well at which S-wave velocities are to be estimated.

The train data set generation unit 120 may generate train data sets TS including train data TD having values of the multiple factors included in the well logs, the values being arranged corresponding to measured depth, and label data LD having S-wave velocities corresponding to measured depth as answers. Different ways of sampling techniques could be applied on train data sets TS so that the generated train data sets TS are different from each other. The train data set generation unit 120 sampling data of the well logs to generate the train data sets TS will be described in detail below.

The train data set generation unit 120 may generate test data necessary to evaluate performance of the S-wave estimation model. The train data set generation unit 120 may generate test data using well logs that are not included in the train data sets TS. The test data includes input data and label data, as same as the train data sets are, and is not used to train the S-wave estimation model but is used in the performance evaluation process of the S-wave estimation model.

The train data set generation unit 120 may generate unseen data UD having values of the multiple factors included in the well logs acquired from the well at which S-wave velocities are to be estimated, the values being arranged corresponding to measured depth. The unseen data UD may be generated in the same structure as the train data TD of the train data sets TS used to train the selected S-wave estimation model.

The model training unit 130 trains the S-wave estimation model using the train data sets TS. The model training unit 130 trains the S-wave estimation model to output S-wave velocities corresponding to measured depth when the well logs are input using the train data sets TS generated by the train data set generation unit 120. The model training unit 130 may input the label data LD of the train data sets TS and compare predicted labels PL output from the S-wave estimation model with the label data LD of the train data sets TS to repeatedly train the S-wave estimation model.

The model training unit 130 may train the S-wave estimation model to output S-wave velocities corresponding to measured depth when the well logs are input. The model training unit 130 may train multiple S-wave estimation models, each of which is trained uniquely either by adopting different model structures or by using partially different train data sets TS. The S-wave estimation model may include linear regression, polynomial regression, a single point dense model (SPDM), a single point convolution model (SPCM), a multipoint dense model (MPDM), a multipoint convolution model (MPCM), and other artificial intelligence models.

The model training unit 130 may train an S-wave estimation model for each of the train data sets TS generated by the train data set generation unit 120 in order to train different S-wave estimation models.

The model selection unit 140 evaluates performance of the S-wave estimation models trained by the model training unit 130, and selects a model having the highest performance. The model selection unit 140 may evaluate performances of the S-wave estimation models different in at least one structure from the train data sets, and may select an S-wave estimation model having the highest performance. The model selection unit 140 may evaluate performances of the S-wave estimation models using an evaluation method, such as MAE or MAPE. The model selection unit 140 may support the evaluation of performances of the models by visualizing performances of the S-wave estimation models using graphs such that the estimated S-wave velocities and the answer S-wave velocities are compared to determine how much the estimated velocities are close to the answers.

The error correction unit 150 may perform an error correction step for the estimated S-wave velocities made by the S-wave estimation model. In the error correction step, the error correction unit 150 may correct an offset between the estimated S-wave velocities and the answer S-wave velocities, or may perform statistical correction in the case in which the following condition (Mathematical Equation 1 below) is not satisfied.

$$\forall d \in MD, |Vs_d^{pred.} - Vs_d^{tar.}| \leq \theta \qquad \text{[Mathematical Equation 1]}$$

(MD: a range of measured depth values, d: a measured depth, $Vs_d^{pred.}$: the value of an estimated S-wave velocity at a measured depth, $Vs_d^{tar.}$: the value of an answer S-wave velocity at a measured depth, and $\theta$: a critical value)

If there is any single occurrence where the difference between the value of the estimated S-wave velocity and the value of the answer S-wave velocity is greater than a critical value within a range of measured depth values (i.e., a range from the minimum depth to the maximum depth of the well), the error correction unit 150 may statistically correct an error in the S-wave velocity estimated by the S-wave estimation model.

The S-wave velocities estimation unit 160 inputs the unseen data UD having values of the multiple factors included in the well logs acquired from the well at which S-wave velocities are to be estimated, the values being arranged corresponding to measured depth, to the S-wave estimation model trained by the model training unit 130 to estimate S-wave velocities corresponding to measured depth. The S-wave velocities estimation unit 160 may generate the results of estimation of S-wave velocities corresponding to measured depth as a visual chart. For example, the S-wave velocities estimation unit 160 may generate a visual chart by showing the both estimated and answer S-wave velocities corresponding to measured depth as two line charts.

The S-wave velocities estimation unit 160 may further perform an ensemble process of deciding the final S-wave velocity: by inputting the unseen data UD having values of the multiple factors included in the well logs acquired from the well at which S-wave velocities are to be estimated, the values being arranged corresponding to measured depth, to the S-wave estimation model trained by the model training unit 130 to estimate S-wave velocities corresponding to measured depth; and by synthesizing S-wave velocities corresponding to measured depth corresponding to a target measured depth, present in each of a plurality of predicted labels PL output as the result of inputting all unseen data UD including measured depths corresponding to the target measured depth to the S-wave estimation model.

The input and output unit 170 may allow the well logs to be input from the outside or may output an estimation result or a learning result to the outside. The input and output unit 170 may include a display capable of visually displaying data, and may further include communication modules for transmission and reception of data, ports for transmission and reception of data, touch panels configured to receive user input, and input and output devices, such as keyboards or mouse.

The storage unit 180 may store program code necessary to perform a method of learning well logs according to an embodiment of the present invention to estimate S-wave velocities, the structure of an S-wave estimation model, a trained S-wave estimation model, an error correction algorithm, an error correction result, a visual chart, and other information.

The train data set generation unit 120, the model training unit 130, the model selection unit 140, the error correction unit 150, and the S-wave velocities estimation unit 160 according to the embodiment of the present invention may be realized as program code so as to be driven by an information processing device, such as a processor, a central processing unit (CPU), a graphics processing unit (GPU), or a neuromorphic chip.

Figure 3:
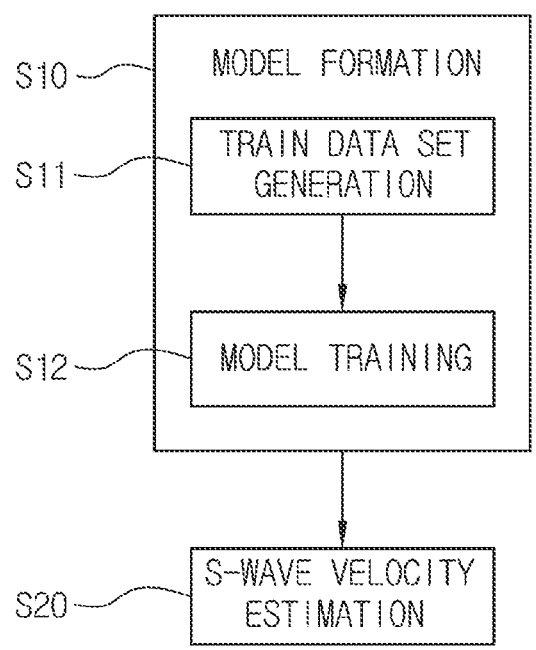
FIG. 3 is a flowchart showing a method of estimating S-wave velocities by learning well logs according to an embodiment of the present invention.

FIG. 3 is a flowchart showing a method of estimating S-wave velocities by learning well logs according to an embodiment of the present invention.

Referring to FIG. 3, the method of estimating the S-wave velocity by learning the well logs according to the embodiment of the present invention may include: a model formation step (S10) of forming an S-wave estimation model to output S-wave velocities corresponding to measured depth when the well logs are input based on train data sets TS including train data TD having values of multiple factors included in the well logs, the values being arranged corresponding to measured depth, and label data LD having S-wave velocities corresponding to measured depth as answers; and an S-wave velocity estimation step (S20) of inputting unseen data UD having values of multiple factors included in well logs acquired from a well at which S-wave velocities are to be estimated, the values being arranged corresponding to measured depth, to the S-wave estimation model to estimate S-wave velocities corresponding to measured depth.

The model formation step (S10) may include: a train data set generation step (S11) of generating train data sets TS including train data TD having measured values of the multiple factors included in the well logs based on a target measured depth, a measured depth shallower than the target measured depth, and a measured depth deeper than the target measured depth, the measured values being disposed in a two-dimensional matrix structure, and label data LD having S-wave velocities at the target measured depth as answers; and a model training step (S12) of training an S-wave estimation model with a multipoint convolution model (MPCM) structure that outputs S-wave velocities at the target measured depth, the measured depth shallower than the target measured depth, and the measured depth deeper than the target measured depth for each measured depth using the train data sets TS. The estimated S-wave velocity is the value of the result that the S-wave estimation model estimates as S-wave velocities at the target measured depth.

The train data set generation unit 120 may perform the train data set generation step (S11). In the train data set generation step (S11), the train data set generation unit 120 forms train data sets using some of the well logs stored in the well log DB 110. In the train data set generation step (S11), the structure of the train data sets TS may be changed depending on the structure of an S-wave estimation model to be trained.

Figure 4:
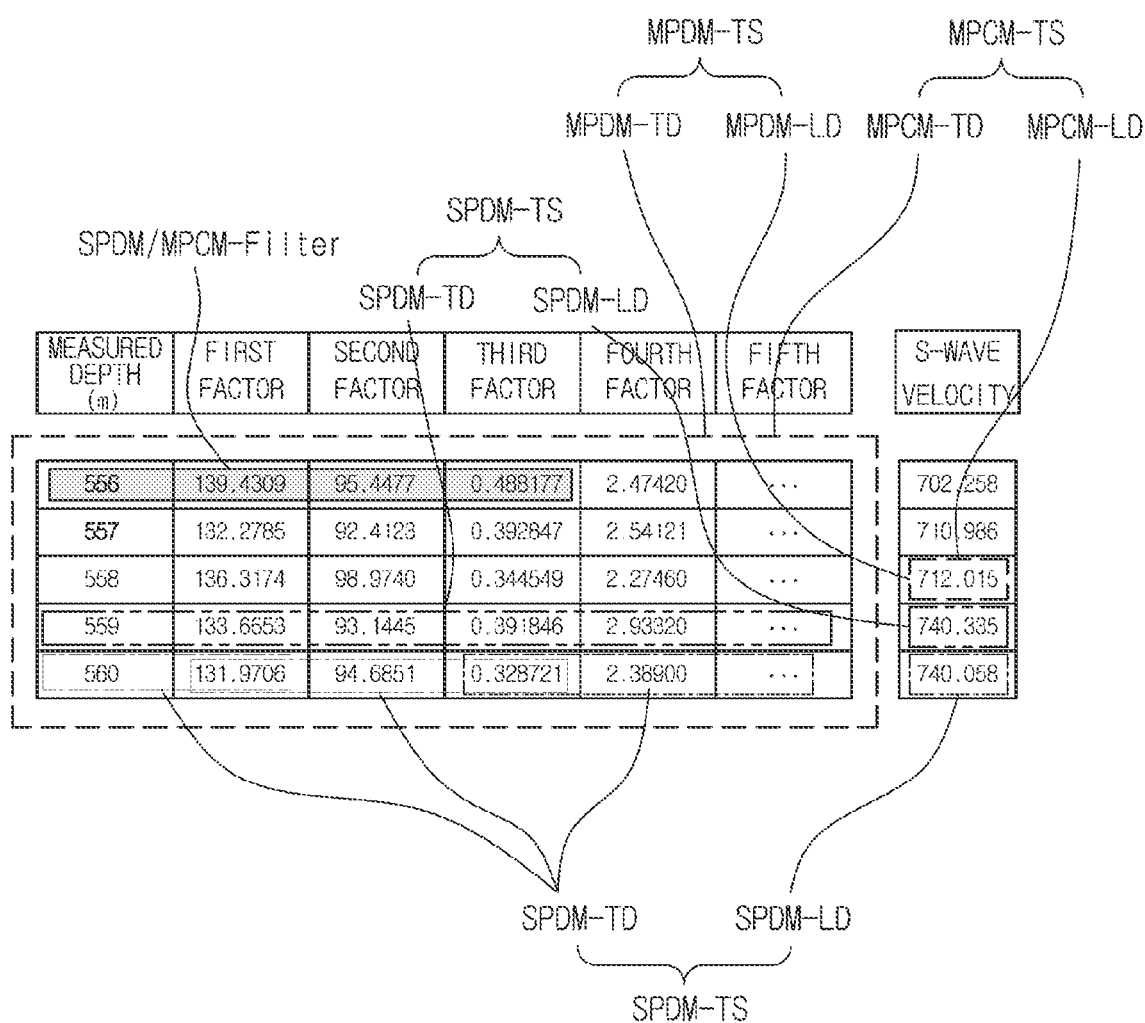
FIG. 4 is a view showing example train data sets according to an embodiment of the present invention.

FIG. 4 is a view showing example train data sets TS according to an embodiment of the present invention. FIG. 4 shows a sample train data sets structure used to train a single point dense model structure, a single point convolution model structure, a multipoint dense model structure, and a multipoint convolution model structure.

Referring to FIG. 4, train data sets SPDM-TS of the single point dense model (SPDM) may include train data SPDM-TD of the single point dense model including first to third factors at a target measured depth of 557 m and label data SPDM-LD of the single point dense model including S-wave velocities at a target measured depth of 557 m. The single point dense model may generate train data sets TS for each target measured depth.

Train data sets SPCM-TS of the single point convolution model (SPCM) may include train data SPCM-TD of the single point convolution model including a measured depth and a first factor, first to third factors, or third to fifth factors, at a target measured depth of 559 m and label data SPCM-LD of the single point convolution model including S-wave velocities at a target measured depth of 559 m.

As described above, the train data sets generated in the train data set generation step (S11) may have different shapes depending on S-wave estimation models.

Referring to FIG. 4, train data sets MPDM-TS/MPCM-TS of the multipoint dense/convolution model (MPDM/MPCM) may include train data MPDM-TD/MPCM-TD of the multipoint dense/convolution model having some of the well logs arranged in a two-dimensional matrix form and label data MPDM-LD/MPCM-LD of the multipoint dense/convolution model having S-wave velocities corresponding to a target measured depth. For example, the train data MPDM-TD/MPCM-TD of the multipoint dense/convolution model may have a matrix structure in which rows (or columns) including a target measured depth, a measured depth shallower than the target measured depth, and a measured depth deeper than the target measured depth are provided, a measured depth is located in a first column, and first to fifth factors are located in second to sixth columns, whereby the well logs has a number of rows (or columns) corresponding to the number of factors included in the train data sets TS. The rows and the columns may be exchanged with each other, and the positions of the factors may be changed. Preferably, the measured depths are arranged in order. FIG. 4 shows that the sample train data MPDM-TD/MPCM-TD of the multipoint dense/convolution model has a 5×6 matrix structure, the values of the factors based on depth are arbitrarily stated.

The measured depth included in the train data MPDM-TD/MPCM-TD of the multipoint dense/convolution model may include a target measured depth, a measured depth shallower than the target measured depth, and a measured depth deeper than the target measured depth. Three measured depths (a target measured depth, a shallow measured depth, and a deep measured depth), five measured depths (a target measured depth, two shallow measured depths, and two deep measured depths), or seven measured depths (a target measured depth, three shallow measured depths, and three deep measured depths) may be selected. For example, in the case in which the target measured depth is 558 m, the number of measured depths included in the train data MPDM-TD/MPCM-TD of the multipoint dense/convolution model may be five, such as 558 m, which is the target measured depth, 556 m and 557 m, which are measured depths shallower than the target measured depth, and 559 m and 560 m, which are measured depths deeper than the target measured depth.

The factors included in the train data MPDM-TD/MPCM-TD of the multipoint dense/convolution model may include a measured depth and other factors. In the case in which the measured depth and the first to fifth factors are selected, six factors are provided, and values of the first to fifth factors corresponding to measured depth are included in the train data MPDM-TD/MPCM-TD of the multipoint dense/convolution model.

Figure 5:
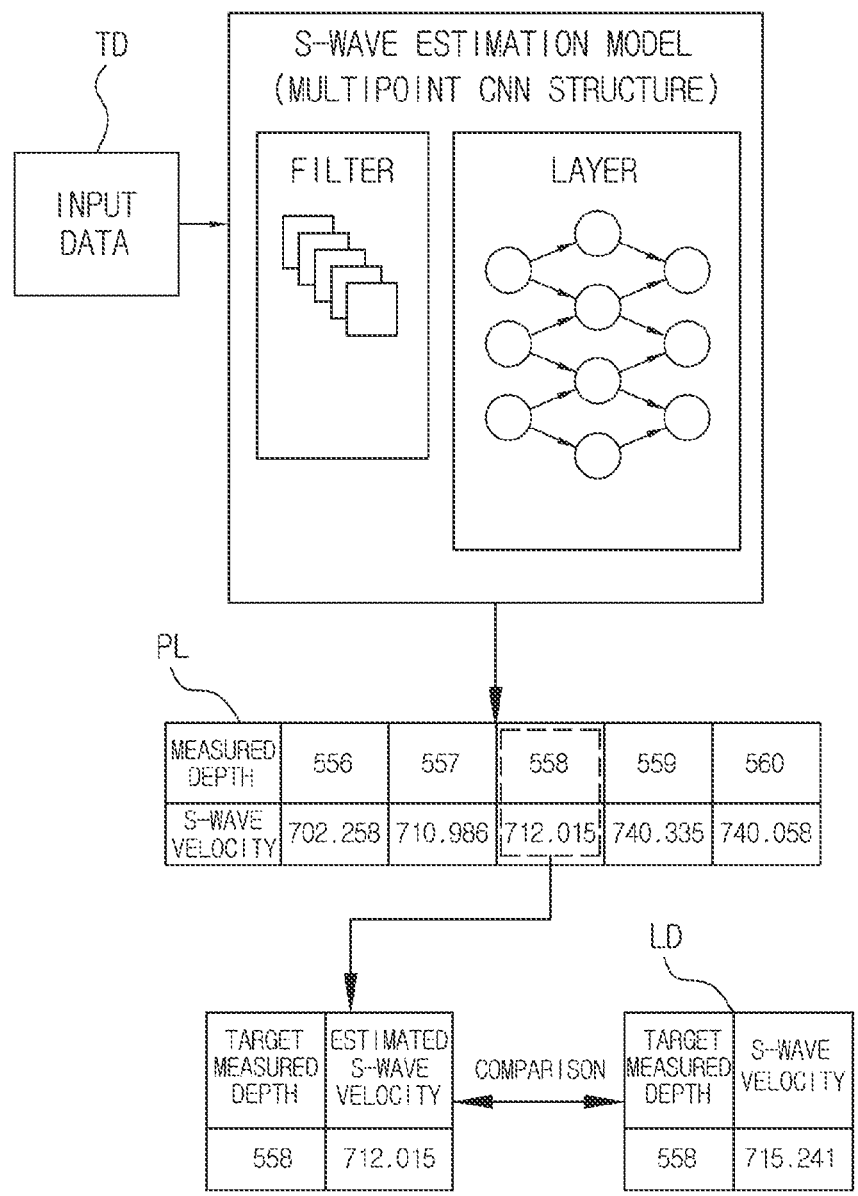
FIG. 5 is a view illustrating an S-wave estimation model having a multipoint convolution model structure according to an embodiment of the present invention.

FIG. 5 is a view illustrating an S-wave estimation model having a multipoint convolution model structure according to an embodiment of the present invention. In this specification and the accompanying drawings, the "multipoint convolution model" may be simply referred to as a "multipoint CNN."

As shown in FIG. 5, the S-wave estimation model according to the embodiment of the present invention may have a multipoint convolution model structure. In the multipoint CNN structure, filters (see FIG. 4) may have different sizes (1, 3, 5, and 7), and four hidden layers may be provided.

The S-wave estimation model having the multipoint CNN structure may output S-wave velocities at measured depths corresponding to the measured depths included in the train data TD of the train data sets TS. For example, in the case in which the measured depths included in the train data TD (see FIG. 4) of the train data sets TS are 556 m to 560 m and the target measured depth is 558 m, S-wave velocities at 558 m, which is the target measured depth, S-wave velocities at 556 m and 557 m, which are measured depths shallower than the target measured depth, and S-wave velocities at 559 m and 560 m, which are measured depths deeper than the target measured depth, are all output.

The S-wave estimation model having the multipoint CNN structure may decide the S-wave velocity at the measured depth corresponding to the target measured depth, among predicted labels PL, as an estimated S-wave velocity. As shown in FIG. 5, the S-wave velocity corresponding to 558 m, which is the target measured depth, among the predicted labels PL of the S-wave estimation model, may be decided as an estimated S-wave velocity.

When the estimated S-wave velocity is decided, the model training unit 130 compares the same with S-wave velocities of the label data LD. In the case in which the estimated S-wave velocity is different from the S-wave velocity of the label data LD, the model training unit 130 may repeatedly train the S-wave estimation model. In the case in which the difference between the estimated S-wave velocity and the S-wave velocity of the label data LD is within a predetermined range, the model training unit 130 may determine that training has been completed and may stop training.

Figure 6:
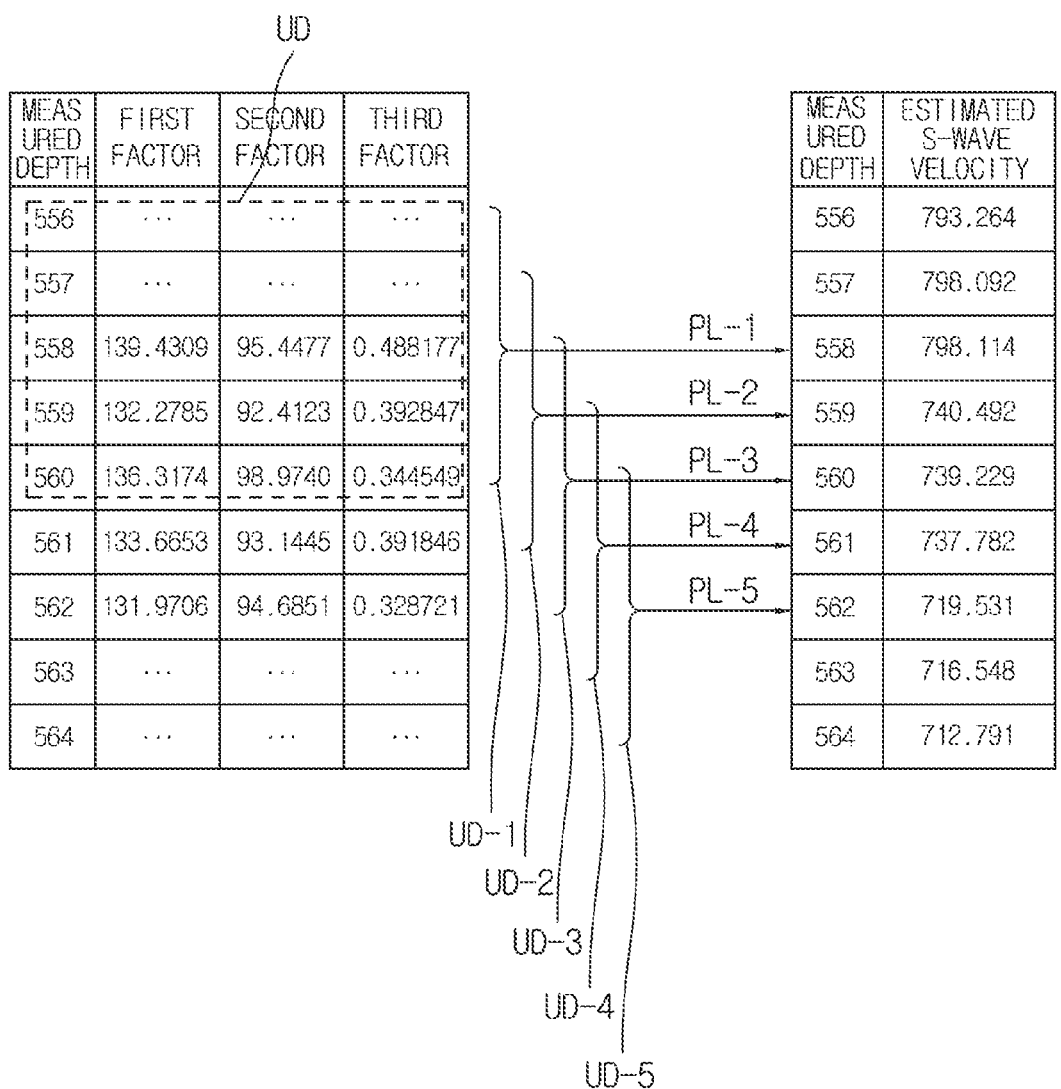
FIG. 6 is a view showing example unseen data and predicted labels based on the S-wave estimation model having the multipoint convolution model structure according to the embodiment of the present invention.

FIG. 6 is a view exemplarily showing unseen data UD and predicted labels PL based on the S-wave estimation model having the multipoint convolution model structure according to the embodiment of the present invention.

The S-wave velocity estimation step (S20) may be performed by the S-wave velocities estimation unit 160. The S-wave velocity estimation step (S20) may be performed using the S-wave estimation model trained by the model training unit 130 using the train data sets TS generated by the train data set generation unit 120. The S-wave velocity estimation step (S20) may include: a unseen data generation step of generating unseen data UD having measured values of the multiple factors included in the well logs based on a target measured depth, a measured depth shallower than the target measured depth, and a measured depth deeper than the target measured depth, the measured values being disposed in a two-dimensional matrix structure based on the well logs acquired from the well at which S-wave velocities are to be estimated; and a model use step of outputting S-wave velocities for each of the measured depths corresponding to the measured depths included in the train data TD of the train data sets TS, output as the result of inputting the unseen data UD to the S-wave estimation model and deciding the S-wave velocity at the measured depth corresponding to the target measured depth as an estimated S-wave velocity.

In the S-wave velocity estimation step (S20), S-wave velocities may be estimated for each of the measured depths included in the well logs obtained from the well at which estimation of the S-wave velocity is necessary in order to estimate S-wave velocities at some or all of the entire depths of the well. In the S-wave velocity estimation step (S20), the unseen data generation step and the model use step may be repeatedly performed for each target measured depth in order to estimate S-wave velocities at some or all of the measured depths of the well at which estimation of the S-wave velocity is necessary.

For example, in the case in which the number of target measured depths is 5, i.e., the target measured depths are 558 to 562, unseen data UD having a two-dimensional matrix structure of 5×4 including five measured depths including a target measured depth, two measured depths shallower than the target measured depth, and two measured depths deeper than the target measured depth and including a measured depth and first and third factors may be generated in the unseen data generation step, as shown in FIG. 6. Unseen data UD may be generated for each of the five target measured depths, whereby first to fifth unseen data UD-1, UD-2, UD-3, UD-4, and UD-5 may be generated. Here, the S-wave estimation model, to which such unseen data UD are input, is trained by train data sets TS including train data TD having a two-dimensional matrix structure of 5×4 in the same manner as the unseen data UD.

When the first unseen data UD-1 are input to the S-wave estimation model having the multipoint CNN structure, predicted labels PL having S-wave velocities output for each of the measured depths included in the first unseen data UD-1 may be obtained, as shown in FIG. 5, and S-wave velocities at the measured depth corresponding to the target measured depth, thereamong, may be decided as an estimated S-wave velocity. In the case in which the first unseen data UD-1 to the fifth unseen data UD-5 may be input to the S-wave estimation model to obtain a first predicted label PL-1 to a fifth predicted label PL-5 and S-wave velocities at the measured depth corresponding to the target measured depth is decided as an estimated S-wave velocity, it is possible to obtain the result like the estimated S-wave velocity of FIG. 6.

In an embodiment of the present invention, the train data TD of the train data sets TS and the unseen data UD are generated in a two-dimensional matrix structure and are input to the S-wave estimation model having the multipoint CNN structure, whereby the S-wave estimation model may learn information about strata at a target measured depth and may also learn information about strata shallower than the target measured depth and strata deeper than the target measured depth. Consequently, it is possible for the S-wave estimation model to more accurately estimate the S-wave velocity at the strata corresponding to the target measured depth.

Figure 7:
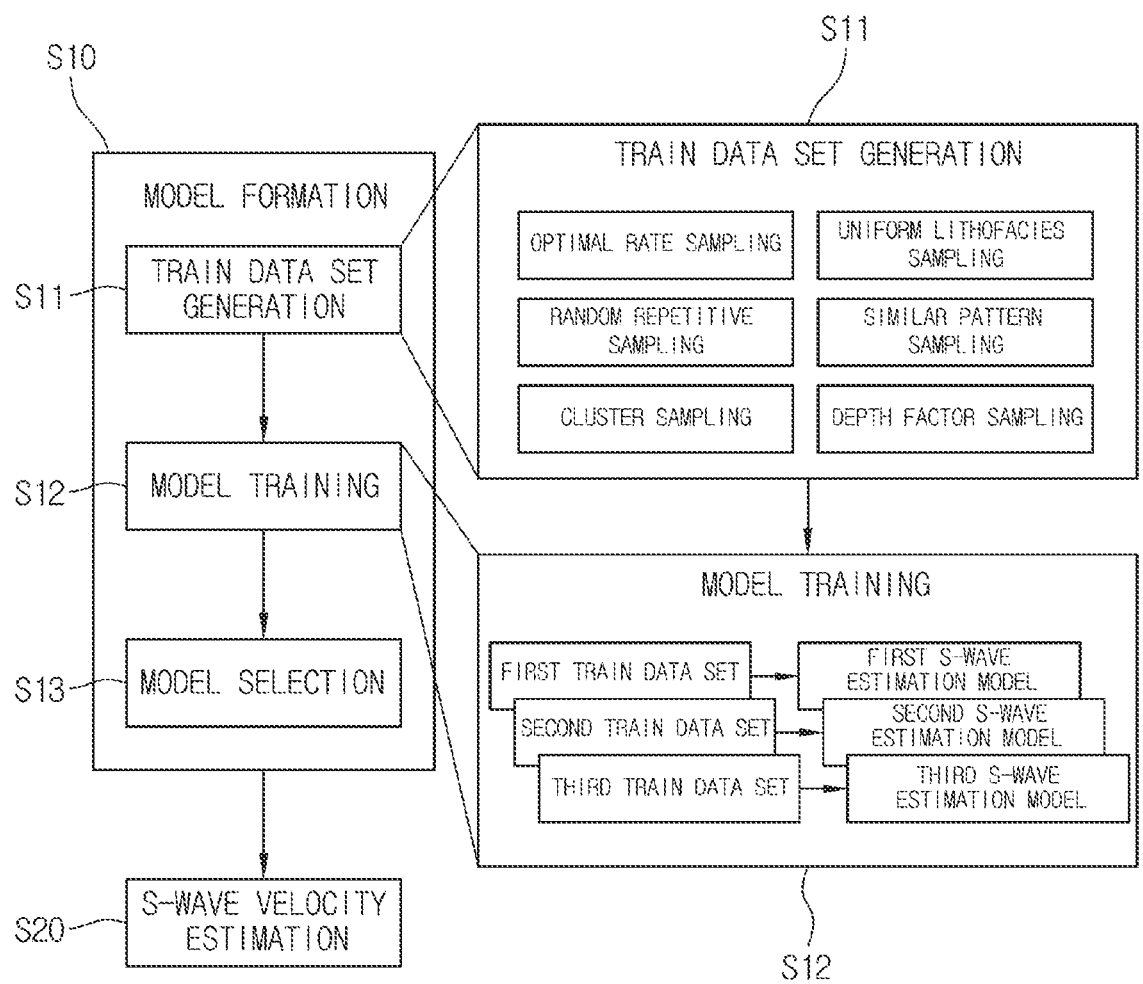
FIG. 7 is a flowchart showing a model formation step further including a model selection step according to an embodiment of the present invention.

FIG. 7 is a flowchart showing a model formation step (S10) further including a model selection step (S13) according to an embodiment of the present invention.

The model formation step (S10) may include: a train data set generation step (S11) of generating train data sets TS including train data TD having values of the multiple factors included in the well logs, the values being arranged corresponding to measured depth, and label data LD having S-wave velocities corresponding to measured depth as answers, wherein Different ways of sampling techniques could be applied on train data sets TS so that the generated train data sets TS are different from each other; a model training step (S12) of training the S-wave estimation model to output S-wave velocities corresponding to measured depth when the well logs are input, wherein S-wave estimation models having various structures are trained using the plurality of train data sets TS, at least some of which are different from each other, in order to train a plurality of S-wave estimation models different in at least one structure from the train data sets TS; and a model selection step (S13) of evaluating performance of the plurality of S-wave estimation models different in at least one structure from the train data sets TS and selecting an S-wave estimation model having the highest performance.

The well logs stored in the well log DB 110 are acquired from wells formed in various strata. The wells are different from each other in terms of various items, such as the kind of lithofacies, the rate and depth of lithofacies, the kind of measured factors, the pattern of factor values, and the location of the wells. In order to accurately estimate S-wave velocities at an arbitrary well using well logs acquired from a plurality of wells having different properties, it is important to select data of the well logs to be included in the train data sets TS.

In the train data set generation step (S11), at least one of optimal rate sampling, uniform lithofacies sampling, random repetitive sampling, similar pattern sampling, cluster sampling, or depth factor sampling may be performed to generate train data sets TS, and two or more kinds of sampling may be simultaneously performed to generate train data sets TS.

Optimal rate sampling entails generating a plurality of train data sets TS at various rates in order to determine an optimal rate of data to be used as train data sets TS and data to be used as test data in the well logs. For example, in the case in which train data sets TS are generated using well logs of first to fourth wells, 80% of data in the well logs of the first to fourth wells may be generated as train data sets TS, and 20% of the data may be generated as test data. When the train data sets TS are sampled at rates of 80%, 70%, and 60%, three train data sets TS are generated. Three S-wave estimation models may be trained using the three train data sets TS, and performance of the three S-wave estimation models may be evaluated in order to determine a rate of the train data sets TS which results in the highest performance.

Uniform lithofacies sampling entails selecting data such that the lithofacies rates of well logs included in the train data sets TS are uniform. A range of S-wave velocities is changed depending on kind of lithofacies, and a range of values of factors included in the well logs are changed depending on kind of lithofacies. In the case in which a lithofacies is hard and dense, a range of S-wave velocities is large. In the case in which the lithofacies is soft and porous, a range of S-wave velocities is small. In the case in which five lithofacies A to E are included in the well logs, data in the well logs may be selected through uniform lithofacies sampling such that a rate of lithofacies A is 20%, a rate of lithofacies B is 20%, a rate of lithofacies C is 20%, a rate of lithofacies D is 20%, and a rate of lithofacies E is 20%. Since a specific lithofacies may be distributed in large quantities and other lithofacies may hardly exist depending on the strata in which the well is formed and the location of the well, the distribution of lithofacies in well logs acquired from a single well may be nonuniform. In the case in which train data sets TS are generated using the well logs having nonuniform distribution of lithofacies without any change, accuracy in estimation of a range of S-wave velocities that appears at lithofacies having a high distribution rate may be high, but accuracy in estimation of a range of S-wave velocities that appears at lithofacies having a low distribution rate may be low. In the case in which the S-wave estimation model is trained using the train data sets TS generated by performing uniform lithofacies sampling, it is possible for the S-wave estimation model to uniformly learn well logs corresponding to various ranges of S-wave velocities. Consequently, it is possible for the S-wave estimation model to exhibit uniform estimation accuracy in various ranges of S-wave velocities.

Random repetitive sampling entails randomly extracting data from one or more well logs, wherein a determination is made as to whether each lithofacies included in the finally extracted data exists at more than a predetermined rate. In the case in which a specific lithofacies is included at less than the predetermined rate, extraction of data is repeated. In random repetitive sampling, a rate of each lithofacies is a value that can be set. In the case in which there exists a kind of lithofacies having low accuracy in estimation of the S-wave velocity, a rate of the lithofacies may be adjusted so as to be high such that a large amount of well log data related to the specific lithofacies are included in the train data sets TS and the S-wave estimation model can learn a larger amount of data related to lithofacies that are difficult to estimate. In this case, well logs related to a specific range of S-wave velocities is further learned, it is possible to improve accuracy in estimation of a specific range of S-wave velocities.

Similar pattern sampling entails extracting, in well units, well logs having a pattern similar to the pattern of the value of a specific factor of the well logs acquired from the well at which S-wave velocities are to be estimated in order to generate train data sets TS. For example, when the value of a specific factor of well logs acquired from a well at which S-wave velocities are to be estimated is within a range of 130 to 140, well log data having similar patterns in the state in which the value of the specific factor is within a range of 130 to 140 or a range adjacent thereto, among well logs acquired from various wells stored in the well log DB 110, may be selected in well units or only data having similar patterns are selected so as to be included in the train data sets TS, and the well logs in which the value of the specific factor is within a range of 50 to 60 may be excluded so as not to be included in the train data sets TS. In the similar pattern sampling, it is possible to train the S-wave estimation model using well logs having a range of values similar to that of the well logs acquired from the well at which the S-wave velocity is to be estimated, whereby it is possible to improve accuracy in estimation of the S-wave velocity.

Cluster sampling entails selecting well logs acquired from a well belonging to a cluster predicted to have strata similar to those of the well at which S-wave velocities are to be estimated in order to generate train data sets TS. In the cluster sampling, well logs acquired from a predetermined number of wells in the order close to a well at which S-wave velocities are to be estimated may be selected to generate train data sets TS. Alternatively, in cluster sampling, the values of factors of well logs acquired from a well at which S-wave velocities are to be estimated and well logs stored in the well log DB 110 may be classified in well units using a cluster algorithm, and well logs acquired from wells classified as the same cluster may be selected to generate train data sets TS. A well-known algorithm, such as a k-means algorithm, may be used as the cluster algorithm. In general, wells close in distance to each other are expected to have similar stratigraphic properties. In the case in which cluster sampling is performed based on a short distance, therefore, it is possible to improve accuracy in estimation of the S-wave velocity. Meanwhile, even nearby wells may have non-similar stratigraphic properties for reasons, such as existence of a dislocation between wells. Consequently, in the cluster sampling, in which a well generally having similar values of factors is selected using the cluster algorithm, it is possible to improve accuracy in estimation of the S-wave velocity.

Depth factor sampling entails differently selecting the range of measured depths and the number and kind of factors included in train data sets TS configured to have a two-dimensional matrix structure. Referring to FIG. 4, five measured depths may be included in the train data sets TS, and a total of six factors, including a measured depth and first to fifth factors, may be included in the train data sets TS. In the case in which depth factor sampling is performed, a plurality of train data sets TS having various combinations, such as the case in which the number of measured depths is 3, 5, 7, 9, or more and the case in which the number of factors is 2, 3, 4, 5, 6, 7, 9, or more, may be generated. In addition, a plurality of train data sets TS having the same number of factors but different kinds of factors may be generated. In addition, a plurality of train data sets TS having the same number and kind of factors but different sequences of factors may be generated. The S-wave estimation model may be trained using each of the plurality of train data sets TS and then performance of the S-wave estimation model may be evaluated, whereby it is possible to know the number of measured depths having the highest performance, the number of factors, the kind of factors, and the sequence of factors.

In the train data set generation step (S11), at least one of optimal rate sampling, uniform lithofacies sampling, random repetitive sampling, similar pattern sampling, cluster sampling, or depth factor sampling described above may be performed to generate a plurality of train data sets TS, at least some of which includes another plurality of well logs. In the train data set generation step (S11), when a piece of train data sets TS is generated, one or more kinds of sampling may be performed together.

In the model training step (S12), S-wave estimation models having various structures may be trained using various train data sets TS generated in the train data set generation step (S11). The S-wave estimation model that the model training unit 130 may use in the model training step (S12) may include linear regression, polynomial regression, a single point dense model (SPDM), a single point convolution model (SPCM), a multipoint dense/convolution model (MPDM MPCM), and other artificial intelligence models. A plurality of train data sets TS generated through sampling in the train data set generation step (S11) is generated such that at least some thereof are different from each other. Even in the case in which the same S-wave estimation model is used, therefore, performance may be changed due to a difference in train data sets TS. In addition, even in the case in which the same train data sets TS are used, performance may be changed depending on the structure of the S-wave estimation model. In the model training step (S12), the model training unit 130 may train S-wave estimation models having various structures using various train data sets TS to generate a plurality of trained S-wave estimation models.

The model selection step (S13) may be performed by the model selection unit 140. The model selection unit 140 may input test data to a plurality of S-wave estimation models in order to evaluate performance of the S-wave estimation models. A well-known evaluation method, such as MAE or MAPE, may be used as a method of evaluating the performance in the model selection step (S13). In the model selection step (S13), performance of a plurality of S-wave estimation models trained using the train data sets TS generated through sampling is evaluated, and an S-wave estimation model having the highest performance is selected. The selected S-wave estimation model may be used in the S-wave velocity estimation step (S20).

Table 1 below shows the results of evaluation of accuracy of the S-wave estimation model in well units.

TABLE 1

|  | Regression analysis | Polynomial regression | SPDM | SPCM | MPCM |
|---|---|---|---|---|---|
| Well 1 | 72.9 | 73.2 | 95.2 | 95.8 | 96.4 |
| Well 2 | 78.2 | 54.3 | 93.0 | 92.3 | 96.9 |
| Well 3 | 65.2 | 68.5 | 95.2 | 97.1 | 98.3 |
| Well 4 | 82.5 | 90.3 | 89.4 | 90.1 | 92.6 |
| Well 5 | 71.9 | 62.8 | 97.4 | 95.9 | 96.8 |
| Well 6 | 87.3 | 70.1 | 96.3 | 95.6 | 99.2 |
| ... | ... | ... | ... | ... | ... |

As shown in Table 1, in the case in which the S-wave estimation model has a regression analysis or polynomial regression structure, an accuracy ranging from 60 to 90 is acquired. In the case in which the S-wave estimation model has a single point dense model (SPDM), a single point convolution model (SPCM), or a multipoint convolution model (MPCM), an accuracy of 90 or more is acquired. Consequently, it is possible to confirm that performance of an artificial intelligence type S-wave estimation model is generally high. The structure having the highest accuracy is a multipoint convolution model (MPCM), and the model selection unit 140 generally selects the multipoint convolution model (MPCM).

Hereinafter, the S-wave estimation model having the multipoint convolution model (MPCM) structure having the highest performance as the result of evaluation of performance of the S-wave estimation models according to the embodiment of the present invention will be described.

Figure 8:
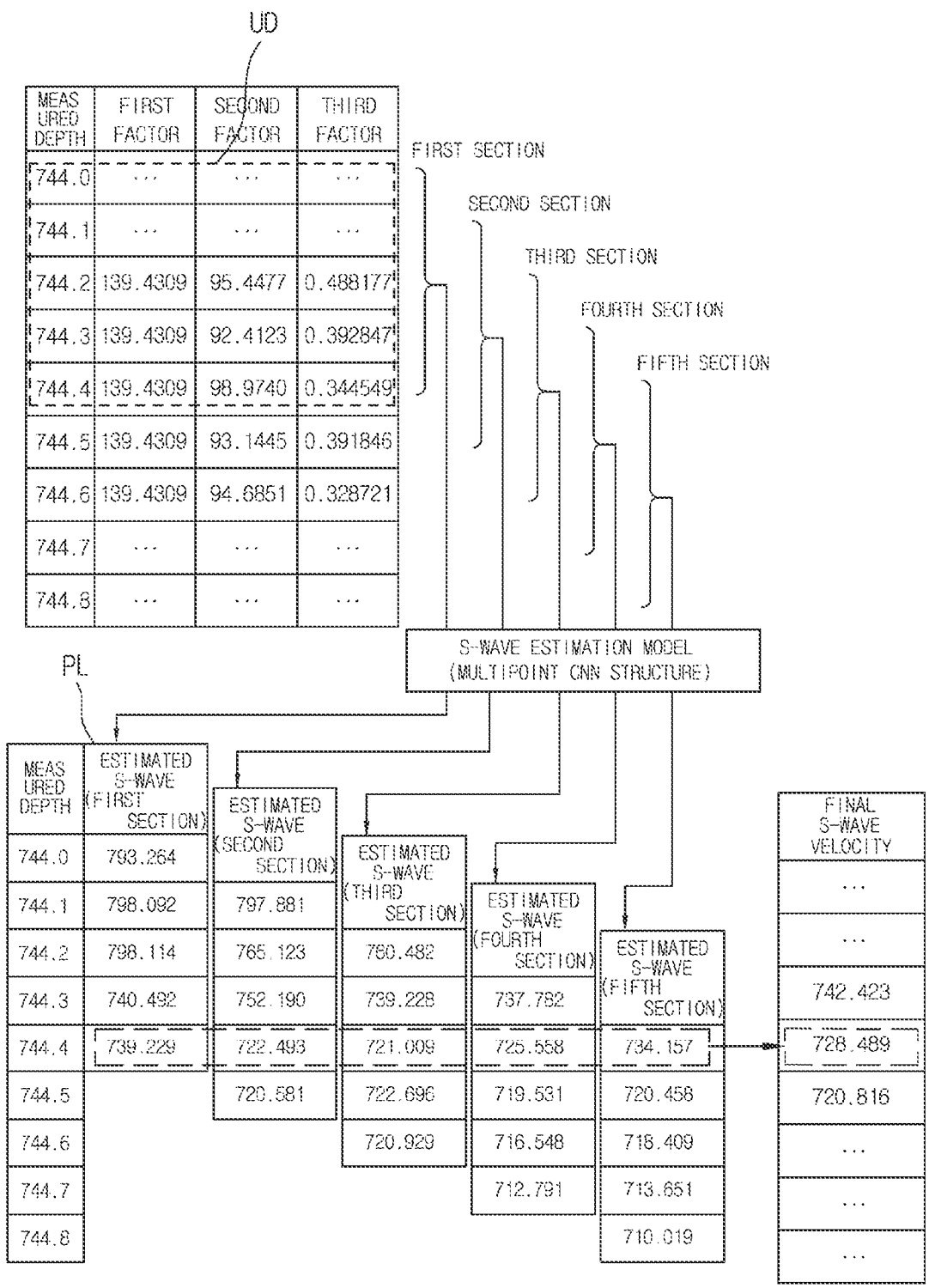
FIG. 8 is a view showing an ensemble process of the S-wave estimation model having the multipoint convolution model structure according to the embodiment of the present invention.

FIG. 8 is a view showing an ensemble process of the S-wave estimation model having the multipoint convolution model (MPCM) structure according to the embodiment of the present invention.

The S-wave estimation model having the multipoint convolution model (MPCM) structure according to the embodiment of the present invention is as shown in FIG. 5, an ensemble process of synthesizing predicted labels PL in order to further improve accuracy may be further included, and the ensemble process may be further performed in the model use step. The model use step may further include an ensemble process of deciding a final S-wave velocity by synthesizing S-wave velocities corresponding to measured depth corresponding to a target measured depth, present in each of a plurality of predicted labels output as the result of inputting all unseen data including measured depths corresponding to the target measured depth to the S-wave estimation model.

Referring to FIG. 8, the ensemble process performed in the model use step is a process for improving accuracy in estimation of the S-wave velocity at the target measured depth. The ensemble process in the case in which the target measured depth is 744.4 will be described by way of example. It is assumed that unseen data UD have a two-dimensional matrix structure of 5×4 including five measured depths and including a total of four factors, such as a measured depth and first and third factors. In the case in which unseen data UD are generated at each measured depth at which S-wave velocities are to be estimated and the unseen data UD are input to the S-wave estimation model having the multipoint CNN structure, it is possible to acquire predicted labels PL. For example, in the case in which the target measured depth is 744.2, unseen data UD are generated in a first section so as to include two measured depths shallower than the target measured depth and two measured depths deeper than the target measured depth. In the case in which the unseen data UD of the first section are input to the S-wave estimation model, predicted labels PL having S-wave velocities estimated at the measured depths included in the first section are generated. In the case in which this process is performed for each target measured depth, unseen data UD may be generated in first to fifth sections, whereby predicted labels PL may be acquired.

S-wave velocities corresponding to a target measured depth of 744.4 is included in each of predicted labels PL corresponding to the first to fifth sections. Even at the same measured depth, estimated S-wave velocities are different from each other in the case in which the sections are different from each other. For example, S-wave velocities at a target measured depth of 744.4 included in the predicted labels PL of the first section is 739.229, and S-wave velocities at a target measured depth of 744.4 included in the predicted labels PL of the second section is 722.493. The reason for this is that sections of unseen data UD input to the S-wave estimation model are different from each other, whereby input well logs are different from each other.

In the ensemble process, S-wave velocities at measured depths corresponding to the target measured depth may be averaged to decide a final S-wave velocity. In the case in which the number of measured depths included in the unseen data UD is five, the number of S-wave velocities to be averaged in order to decide an arbitrary target measured depth in the ensemble process may be five. In the ensemble process, well logs corresponding to a wider range of measured depths than well logs included in unseen data UD having an arbitrary measured depth as a target measured depth may be synthesized. For example, unseen data UD having a target measured depth of 744.4 corresponds to the third section, whereby well logs having measured depths of 744.0, 744.1, 744.7, and 744.8 is not considered. In the case in which the ensemble process is performed, however, well logs having measured depths of 744.0 to 744.8 corresponding to the first to fifth sections may also be considered.

As described above with reference to FIG. 8, in the case in which the ensemble process is performed based on the multipoint CNN structure according to the embodiment of the present invention, S-wave velocities at measured depths corresponding to the target measured depth may be synthesized to estimate a final S-wave velocity. In the case in which the ensemble process is further performed, accuracy in estimation of the S-wave velocity, compared to deciding S-wave velocities included in predicted labels PL of a single section as an estimated S-wave velocity.

Figure 9:
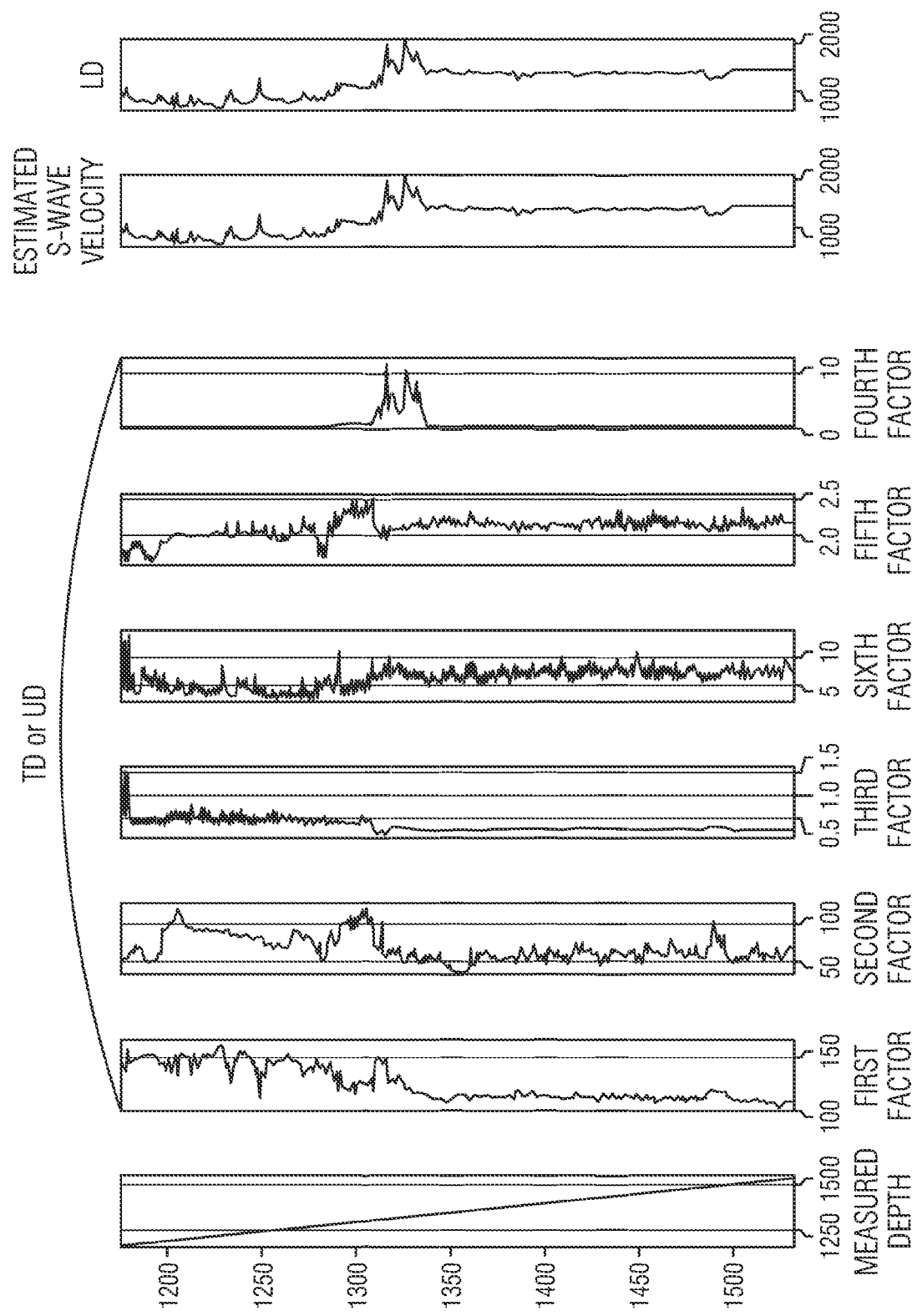
FIG. 9 is a visual chart showing input and output of the S-wave estimation model according to the embodiment of the present invention.

FIG. 9 is a visual chart showing input and output of the S-wave estimation model according to the embodiment of the present invention. The left part of FIG. 9 shows well logs corresponding to train data TD or unseen data UD, and the right part of FIG. 9 shows predicted labels PL of the S-wave estimation model or an estimated S-wave velocity and label data LD, which are compared with the predicted labels PL or the estimated S-wave velocity.

As shown in FIG. 9, a visual chart showing S-wave velocities may be prepared by the S-wave velocities estimation unit 160, and may be visually provided through the input and output unit 170. The S-wave velocities estimation unit 160 may prepare an estimated S-wave velocity or a final S-wave velocity output from the S-wave estimation model as the result of unseen data UD being input to the S-wave estimation model in the form of a graph to generate a visual chart. The visual chart may show at least one of train data TD, label data LD, test data, or predicted labels PL corresponding to measured depth or for each well. The model selection unit 140 may generate a visual chart as shown in FIG. 9 such that people can visually recognize accuracy of the S-wave estimation model.

As described above, in a method and apparatus for estimating S-wave velocities by learning well logs according to an embodiment of the present invention, in order to learn and estimate S-wave velocities in strata at a target measured depth, not only are well logs measured at the target measured depth learned but also information about well logs measured at a measured depth shallower than the target measured depth and information about well logs measured at a measured depth deeper than the target measured depth are learned, whereby it is possible to more accurately measure the S-wave velocity at the target measured depth. In order to learn information about strata above/under the target measured depth, as described above, train data sets TS having a two-dimensional matrix structure is generated, and an ensemble process is further performed using an S-wave estimation model having a multipoint CNN structure capable of effectively learning the train data sets TS having the two-dimensional matrix structure, whereby an optimal S-wave estimation model is constructed.

Also, in the method and apparatus for estimating the S-wave velocity by learning the well logs according to the embodiment of the present invention, a plurality of train data sets TS, at least some of which are different from each other, is generated using various sampling methods, S-wave estimation models having various structures are trained, performance of a plurality of S-wave estimation models different in at least one structure from the train data sets TS is evaluated, and an S-wave estimation model having the highest performance is selected. Consequently, it is possible to effectively analyze well logs acquired from a well at which S-wave velocities are to be estimated, whereby it is possible to accurately estimate the S-wave velocity.

As is apparent from the above description, according to an embodiment of the present invention, it is possible to accurately and rapidly predict S-wave velocities using an artificial intelligence model that has learned well logs.

Although the present invention has been described in detail with reference to the embodiments, the embodiments are provided to describe the present invention in detail, the tube connector for medical treatment according to the present invention is not limited thereto, and those skilled in the art will appreciate that various modifications, additions and substitutions are possible, without departing from the scope and spirit of the invention as disclosed in the accompanying claims.

Simple changes and modifications of the present invention are to be appreciated as being included in the scope and spirit of the invention, and the protection scope of the present invention will be defined by the accompanying claims.

What is claimed is:

1. A method of estimating S-wave velocities by learning well logs, the method comprising:
 a model formation step of forming an S-wave estimation model to output S-wave velocities corresponding to measured depth when the well logs are input based on train data sets comprising train data having values of multiple factors included in the well logs, the values being arranged corresponding to measured depth, and label data having S-wave velocities corresponding to measured depth as answers; and
 an S-wave velocity estimation step of inputting unseen data having values of multiple factors included in well logs acquired from a well at which S-wave velocities are to be estimated, the values being arranged corresponding to measured depth, to the S-wave estimation model to estimate S-wave velocities corresponding to measured depth,
 wherein the unseen data is not included in the train data sets,
 wherein the model formation step comprises:
  a train data set generation step of generating train data sets comprising train data having measured values of the multiple factors included in the well logs based on a target measured depth, a measured depth shallower than the target measured depth, and a measured depth deeper than the target measured depth, the measured values being disposed in a two-dimensional matrix structure, and label data having S-wave velocities at the target measured depth as answers; and
  a model training step of training an S-wave estimation model with a multipoint convolution model structure that outputs S-wave velocities at the target measured depth, the measured depth shallower than the target measured depth, and the measured depth deeper than the target measured depth for each measured depth using the train data sets,
 wherein the two-dimensional matrix structure comprises:
  the measured depth located in a first column; and
  one or more factors located in subsequent columns,
  wherein the measured depth is arranged in odd-numbered rows with the target depth placed at the center, and the measured depth is arranged in order, and
 wherein the S-wave estimation model learns information about strata at the target measured depth and learns information about strata shallower than the target measured depth.

2. The method according to claim 1, wherein the S-wave velocity estimation step comprises:
 a unseen data generation step of generating unseen data having measured values of the multiple factors included in the well logs based on the target measured depth, the measured depth shallower than the target measured depth, and the measured depth deeper than the target measured depth, the measured values being disposed in a two-dimensional matrix structure based on the well logs acquired from the well at which S-wave velocities are to be estimated; and a model use step of outputting S-wave velocities for each of the measured depths corresponding to the measured depths included in the train data of the train data sets, output as a result of inputting the unseen data to the S-wave estimation model and deciding the S-wave velocity at the measured depth corresponding to the target measured depth as an estimated S-wave velocity.

3. The method according to claim 2, wherein the model use step further comprises an ensemble process of deciding a final S-wave velocity by synthesizing S-wave velocities corresponding to measured depth corresponding to the target measured depth, present in each of a plurality of predicted labels output as a result of inputting all unseen data comprising measured depths corresponding to the target measured depth to the S-wave estimation model.

4. An apparatus for estimating S-wave velocities by learning well logs, the apparatus comprising:
    well log database (DB) configured to store well logs, which are data acquired through measurement and analysis after drilling in strata, and S-wave velocities corresponding to measured depth;
    a train data set generation unit configured to generate train data sets comprising train data having values of multiple factors included in the well logs stored in the well log DB, the values being arranged corresponding to measured depth, and label data having S-wave velocities corresponding to measured depth as answers;
    a model training unit configured to train an S-wave estimation model to output S-wave velocities corresponding to measured depth when the well logs are input using the train data sets; and
    S-wave velocities estimation unit configured to input unseen data having values of multiple factors included in well logs acquired from a well at which S-wave velocities are to be estimated, the values being arranged corresponding to measured depth, to the S-wave estimation model trained by the model training unit in order to estimate S-wave velocities corresponding to measured depth,
    wherein the train data set generation unit, the model training unit, and the S-wave velocities estimation unit are realized as program code and driven by a processor,
    wherein the train data sets and the unseen data are measured values of the multiple factors included in the well logs based on a target measured depth, a measured depth shallower than the target measured depth, and a measured depth deeper than the target measured depth, the measured values being disposed in a two-dimensional matrix structure based on the well logs acquired from the well at which S-wave velocities are to be estimated,
    wherein the S-wave estimation model has a multipoint convolution model structure configured to output S-wave velocities at the target measured depth, the measured depth shallower than the target measured depth, and the measured depth deeper than the target measured depth for each measured depth using the train data sets,
    wherein the two-dimensional matrix structure comprises:
        the measured depth located in a first column; and
        one or more factors located in subsequent columns,
            wherein the measured depth is arranged in odd-numbered rows with the target depth placed at the center, and the measured depth is arranged in order, and
    wherein the S-wave estimation model learns information about strata at the target measured depth and learns information about strata shallower than the target measured depth.

5. The apparatus according to claim 4, wherein the S-wave velocities estimation unit further performs an ensemble process of deciding a final S-wave velocity:
    by inputting the unseen data having values of the multiple factors included in the well logs acquired from the well at which S-wave velocities are to be estimated, the values being arranged corresponding to measured depth, to the S-wave estimation model trained by the model training unit to estimate S-wave velocities corresponding to measured depth; and
    by synthesizing S-wave velocities corresponding to measured depth corresponding to the target measured depth, present in each of a plurality of predicted labels output as a result of inputting all unseen data comprising measured depths corresponding to the target measured depth to the S-wave estimation model.

* * * * *